US008646837B2

(12) United States Patent
Bovelli et al.

(10) Patent No.: US 8,646,837 B2
(45) Date of Patent: Feb. 11, 2014

(54) SEAT WITH A SEAT ELEMENT, SEAT ARRANGEMENT AND METHOD FOR MONITORING A SEAT

(75) Inventors: Sergio Bovelli, München (DE); Martin Kluge, Königsbrunn (DE); Winfried Kupke, Ottobrunn (DE); Josef Schalk, Altheim (DE); Hans-Achim Bauer, Hamburg (DE); André Zybala, Hanstedt (DE)

(73) Assignee: Airbus Operations GmbH, Hamburg (DE)

( * ) Notice: Subject to any disclaimer, the term of this patent is extended or adjusted under 35 U.S.C. 154(b) by 399 days.

(21) Appl. No.: 12/743,326

(22) PCT Filed: Nov. 12, 2008

(86) PCT No.: PCT/EP2008/065416
§ 371 (c)(1),
(2), (4) Date: Aug. 24, 2010

(87) PCT Pub. No.: WO2009/062974
PCT Pub. Date: May 22, 2009

(65) Prior Publication Data
US 2010/0308166 A1    Dec. 9, 2010

(30) Foreign Application Priority Data

Nov. 16, 2007 (DE) .......................... 10 2007 055 088

(51) Int. Cl.
*B60N 2/00* (2006.01)
*A47C 7/62* (2006.01)
*A47C 7/72* (2006.01)
*A47C 31/12* (2006.01)

(52) U.S. Cl.
USPC ...................... 297/217.3; 297/217.2; 297/330

(58) Field of Classification Search
USPC .................................... 297/217.2, 217.3, 330
See application file for complete search history.

(56) References Cited

U.S. PATENT DOCUMENTS

| 4,638,982 | A | 1/1987 | Misher et al. |
| 4,812,838 | A * | 3/1989 | Tashiro et al. ............ 297/330 X |
| 6,194,853 | B1 | 2/2001 | Tual et al. |
| 6,425,862 | B1 * | 7/2002 | Brown ................... 297/217.2 X |
| 6,929,218 | B1 | 8/2005 | Sanford et al. |
| 7,163,263 | B1 * | 1/2007 | Kurrasch et al. ........... 297/217.3 |
| 7,201,444 | B2 * | 4/2007 | Schimmoller et al. . 297/217.3 X |
| 7,393,053 | B2 * | 7/2008 | Kurrasch et al. ........... 297/217.3 |
| 7,735,918 | B2 * | 6/2010 | Beck ......................... 297/217.3 |
| 7,794,014 | B2 * | 9/2010 | Beall et al. ............. 297/217.3 X |

(Continued)

FOREIGN PATENT DOCUMENTS

| DE | 33 12 732 C2 | 10/1984 |
| DE | 103 61 647 A1 | 8/2005 |

(Continued)

*Primary Examiner* — Rodney B White
(74) *Attorney, Agent, or Firm* — Global IP Counselors, LLP

(57) ABSTRACT

An aircraft passenger seat has at least one seat element characterized by at least one monitoring apparatus for monitoring the seat element. The seat arrangement has a plurality of seats, wherein at least one seat includes at least one sensor module for monitoring a seat element and a control unit for checking and controlling the monitoring, wherein the at least one sensor module is in a data exchange relationship with the control unit.

22 Claims, 2 Drawing Sheets

(56) References Cited

U.S. PATENT DOCUMENTS

| | | |
|---|---|---|
| 7,896,436 B2 * | 3/2011 | Kurrasch et al. ............ 297/217.3 |
| 8,016,351 B2 * | 9/2011 | Cassaday ............... 297/217.3 X |
| 2005/0184495 A1 | 8/2005 | Zerbe |
| 2005/0242635 A1 * | 11/2005 | Cassaday ................... 297/217.3 |
| 2007/0080258 A1 | 4/2007 | Baatz et al. |
| 2010/0032999 A1 | 2/2010 | Petitpierre |

FOREIGN PATENT DOCUMENTS

| | | |
|---|---|---|
| DE | 10 2005 041 840 B3 | 4/2007 |
| DE | 10 2005 042 403 B3 | 5/2007 |
| EP | 0 973 079 A1 | 1/2000 |
| WO | WO-2007/042740 A2 | 4/2007 |

* cited by examiner

SEAT WITH A SEAT ELEMENT, SEAT ARRANGEMENT AND METHOD FOR MONITORING A SEAT

CROSS-REFERENCE TO RELATED APPLICATIONS

This U.S. National stage application claims priority under 35 U.S.C. §119(a) to German Patent Application No. 10 2007 055 088.1, filed in Germany on Nov. 16, 2007, the entire contents of which are hereby incorporated herein by reference.

BACKGROUND

1. Field of the Invention

The present invention relates to a seat, in particular an aircraft passenger seat with at least one seat element. Furthermore, the present invention relates to a seat arrangement with a plurality of seats, and to a method for monitoring at least one seat with at least one seat element.

2. Background Information

Conventionally it is the usual practice for the cabin crew to determine prior to starting and landing of an aircraft by means of inspection rounds whether all passengers are seated, their seat belts are fastened, the armrests and backrests are in their specified positions and the folding tables mounted on the backrests have been folded up. The security status is visually inspected. These inspection rounds require high personnel overhead, wherein a plurality of persons may often be used. Furthermore, these inspection rounds only ensure a certain safety since the correct checking of all points mentioned above must be carried out for each individual seat and the probability that at least one such point is overlooked for at least one seat is very high.

SUMMARY

It is thus the object of the present invention to provide a means by which safe checking of one seat, or a plurality of seats, requiring little time and personnel, is possible.

This object is achieved by a seat having the features of a first aspect. A seat arrangement equipped with a plurality of such seats, and a method for monitoring a seat is the subject matter of the further aspects. Advantageous embodiments of the invention are the subject matter of additional aspects.

An inventive idea is thus to provide a monitoring apparatus for monitoring at least one seat element of the seat. A "seat element" can be each section, each seat part or each element associated with the seat, in particular, the seat surface, the backrest, the armrest, the support structure, the seat belt, the cushion, an adjustment means for positional changes of a seat element, such as for adjusting the backrest, or a folding table mounted on the backrest. By these means, inspection rounds carried out by the flight personnel can be dispensed with. Remote querying is possible. A visual inspection is only necessary if an error message occurs.

Furthermore, an individual monitoring apparatus can be used for each seat, a monitoring apparatus can be used for a plurality of seat elements of a seat, or one monitoring apparatus can be used for a plurality of seats.

A "seat" in the context of the present invention is, in particular, an aircraft passenger seat, a motor vehicle seat, spacecraft seat or a watercraft seat. Preferably, such a seat is a seat used by a plurality of different passengers of a transport means, in particular a public transport means.

In a preferred embodiment the monitoring apparatus comprises at least one sensor module for monitoring at least one state value of the seat element. This sensor module is preferably energy autonomous and able to be queried in a wireless fashion.

Such a state value is, for example, adjustments of the seat element, or the seat elements, influences in the area of the seat elements, factors directly or indirectly affecting the seat element, or ambient conditions present in the area of the seat element. For example pressure, temperature, moisture etc. can be detected. Preferred state values will be explained below.

The sensor module is connected to a control unit for data exchange. This control unit is provided remote from the sensor module and is connected, in particular, with a plurality of sensor modules for data exchange. Such a control unit can thus be positioned in the service area of an aircraft only accessible to the cabin crew. The data exchange can be carried out in a wired or wireless fashion. A bus structure can be provided, for example, in the area of the cabin floor, the cabin ceiling or the cabin walls. Preferably, this bus structure is mounted below the cabin floor or integrated in it.

Preferably, at least one sensor module is connected to the control unit via a sensor node. In other words, the above mentioned bus structure can be equipped with such sensor nodes, for example, below the cabin floor, which are then able to communicate with at least one sensor module of a seat by means of wireless data transmission through the cabin floor. The sensor modules of a plurality of seats can also be connected to the control unit via a sensor node. Furthermore, this sensor node can also be provided on or in the seat, for example, in the area of the support structure of the seat. The connection between the sensor nodes and the bus system can be by means of a data line or in a wireless fashion.

In a preferred embodiment of the seat, the sensor module and/or the sensor node can monitor at least one of the following state values in any desired combination: presence of a person on the seat, position of the armrest, position of the backrest, position of a folding table on the backrest, and closure check of the seat belt.

Advantageously, the sensor node and/or the control unit have a memory unit. An identification code, explained further below, can be stored, for example, in this memory unit that uniquely identifies the sensor module and/or the sensor node. This is how the control unit can recognize which seat the state values determined by the sensor modules are to be associated with.

In a further preferred embodiment, a display means is provided for the optical and/or acoustic indication of an error value. Such an error value can be identified if a state value of a seat element deviates in comparison to a predetermined reference value or setpoint value. If, for example, a sensor module determines the state value "seat not occupied", comparison with the reference value "seat occupied" does not result in a match, so that the control unit issues an error value signal. The display means can then initiate an alarm tone or a corresponding light, for example.

With reference to the configuration of the at least one sensor module, at least one of the following embodiments can be chosen. The sensor module can comprise a controller, a data processing unit, a transmitting and/or receiving unit and at least one sensor unit. Furthermore, a converter, a transceiver, an aerial, a bridge amplifier, a voltage amplifier and/or a filter can be provided.

At least one power generator is provided that is associated or integrated with at least one sensor module for power supply. This power generator can be of an electromechanical, electrothermal, piezoelectric and/or photoelectric type.

Furthermore, it can be provided that the sensor module is associated with a power storage or that such a power storage is integrated into the sensor module. Preferably, the power storage comprises an accumulator and/or a capacitor, in particular, a high power capacitor. Furthermore, the sensor module can comprise an assembly for voltage conversion and charging of the power storage.

In further preferred embodiments, the seat element is a seat surface element, a backrest element, an armrest, a footrest, an operating unit (e.g. folding table) and/or a seat belt. To detect each state value of the seat element, the sensor module can be mounted on the seat element, integrated within it or connected to it. A seat surface can be provided with a trim that includes a sensor module, for example. Furthermore, the fabric of the seat belt can be provided with embedded conductor structures serving as a sensor unit, for example.

Advantageously, the sensor unit is configured to detect occupancy of the seat surface element, the pressure exerted on the seat element, the position of the seat element and/or the temperature of the seat element or in the area of the seat element.

Furthermore it is preferred that the sensor unit includes a piezoelectric pressure measuring unit or a strain gauge unit. By these means the pressure exerted by a body on the seat element or a deformation occurring thereby can be detected. It can thus be determined whether a seat is occupied by an aircraft passenger and it can be excluded that the seat is not occupied by a piece of luggage.

The sensor unit can advantageously include an angular rotation sensor or a switching unit. The angular rotation sensor can be of a magnetic or mechanical type and can be adapted, for example, to indicate two extreme positions. The switching unit can include at least one mechanical limit switch or solenoid and is preferably used for determining the position of the armrests, backrests, the folding table and the seat belt.

The seat arrangement according to the present invention comprises a plurality of seats, in particular of the above-mentioned type, wherein at least one seat includes at least one sensor module for monitoring a seat element, and a control unit for checking and controlling the monitoring process, wherein the at least one sensor module is in a data exchange relationship with the control unit.

The control unit can serve as a central data processing, imaging and display unit, that is, it evaluates the data signals of the sensor modules and displays the state values and can generate alarm messages, if necessary. The transmission between the sensor module(s) and the control unit, between the sensor module and the sensor nodes and/or between the sensor nodes and the control unit is preferably carried out in a wireless fashion, however it can also be at least partially wired. In particular with wireless data transmission, the wiring overhead of the seats and of the cabin floor, for example, can be kept to a minimum. Simple retrofitting of aircraft cabins or other transportation means is thus possible. The number of sensor modules, seats and sensor nodes is freely variable. Furthermore, the sensor modules can have their own power-independent, autonomous power supply, such as generators. These sensor modules determine measuring values or state values on, or in the area of the seat, and transmit their determined values preferably in a wireless fashion to the central sensor node of the seat. The generators can be integrated in each sensor module. Furthermore, the seat nodes and sensor modules can have uniquely identifiable identification means, in particular an identification code. The identification codes of the sensor modules can be transmitted, for example, to the central sensor nodes of the seat during initialization of the monitoring system, and stored there. During initialization, the identification codes can be automatically stored in the central node. This central node can be switched into an initialization mode, for example, in which it receives the data of all sensor modules of one or more seats. Alternatively, the identification means can be stored in the node by means of a program.

The method according to the present invention for monitoring at least one seat with at least one seat element, in particular according to any one of the aspects, comprises the following steps:

providing at least one predetermined reference value or one reference value range for a seat element;

determining at least one state value of the seat element by means of a sensor module;

transmitting the state value to a control unit;

comparing the state value with the reference value (by means of the control unit);

indicating an error value, if the state value does not match the reference value or is not within the reference value range.

In a preferred embodiment, the state value is transmitted from the sensor module to a sensor node. Preferably, the position of a seat element or the pressure exerted on the seat element or the temperature in the area of a seat element is determined as the state value. In particular, the pressure exerted on a seat surface or a backrest can be determined as the state value. It can be detected, for example, whether a predetermined pressure value is exceeded, or which precise pressure value is actually present. Furthermore, the angle of an armrest of a seat can be determined as a state value. This is preferably achieved by means of a rotation angle sensor.

In a preferred further development of the method, an identification value for identifying each sensor module can be transmitted to the sensor node and/or the control unit. Furthermore, at least one state value can be stored in a memory unit. The memory unit can be associated with the sensor module, the sensor node and/or the control unit. Advantageously, any determined error value can be optically and/or acoustically indicated. In this context, it is preferably provided that a display element, for example a display with a loudspeaker, is provided in the area of the service area of an aircraft cabin. To enable easy retrofitting of existing systems, it is preferably provided to transmit the data determined by the sensor modules at least partially in a wireless fashion.

BRIEF DESCRIPTION OF THE DRAWINGS

Exemplary embodiments of the invention will be explained in more detail in the following with reference to the accompanying drawings, wherein.

DETAILED DESCRIPTION OF THE EXEMPLARY EMBODIMENTS

Figure 1:
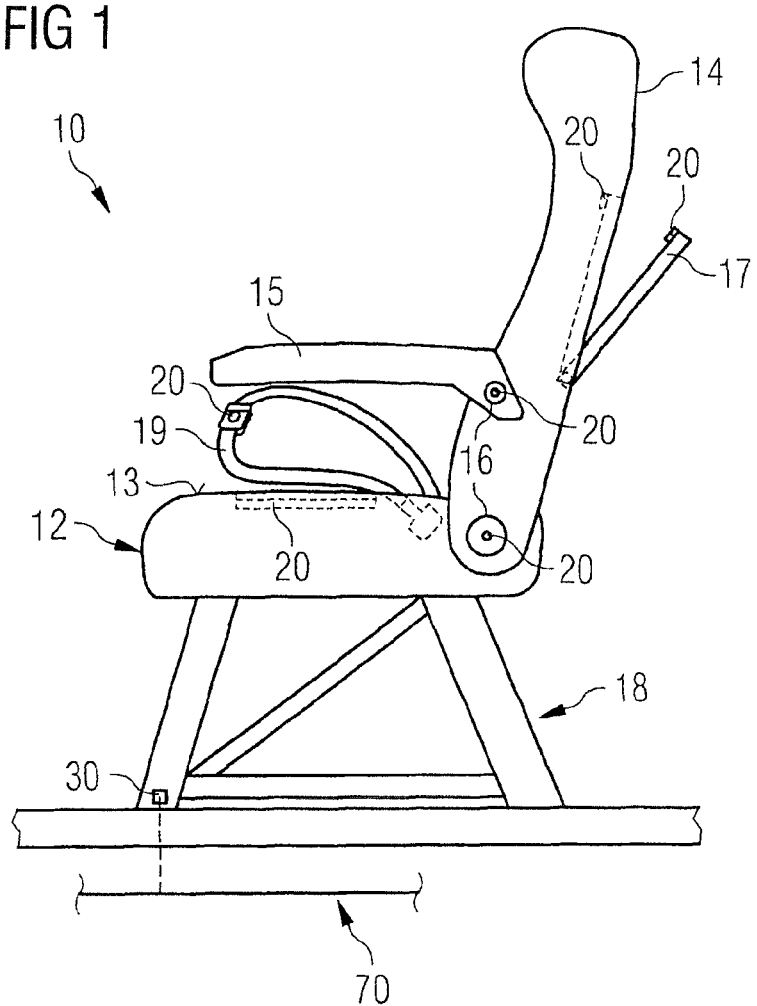
FIG. 1 is a cross-sectional view of a seat according to the present invention, with a plurality of seat elements, and with a plurality of sensor modules.

FIG. 1 shows a seat 10 in the form of an aircraft passenger seat of an aircraft having a plurality of seat elements, formed by a seat cushion 12, a backrest 14, two armrests 15, a table 17 foldably arranged on the backrest 14, and a seat belt 19. A support structure 18 supports the aircraft passenger's seat on the cabin floor. Seat cushion 12 comprises a seat surface 13 formed, for example, by a trim material. As can also be seen in FIG. 1, seat 10 comprises a plurality of sensor modules 20 for monitoring the individual seat elements. A wireless sensor module 20 is thus provided in each of the following: the area of seat surface 13 and the area of joints 16 of backrest 14 and armrest 15, and on seat belt 19. Furthermore, a further sensor module 20 is arranged in the area of the upper end of folding table 17.

Each sensor module 20 comprises a sensor unit 25 for measuring or sensing one or more state values of at least one seat element. Sensor module 20 in the area of seat surface 13 comprises a pressure sensor as sensor module 25, adapted in such a way that it determines whether any pressure is exerted on seat surface 13 at all, without a precise pressure value having to be determined. Sensor module 20 in the area of backrest 14 and armrest 15 comprises a rotation angle sensor as sensor unit 25 in each case, which determines the position of backrest 14, or armrest 15, relative to a fixed reference value. In the area of folding table 17, sensor module 20 includes a two-part solenoid as sensor unit 25. Finally, a solenoid or a mechanical switch is provided as sensor unit 25 in the closure means of seat belt 19. In the belt material of seat belt 19, conductor strips are embedded that serve as a power supply or that can be used as a power loop for sensor unit 25 to check the state value.

Figure 2:
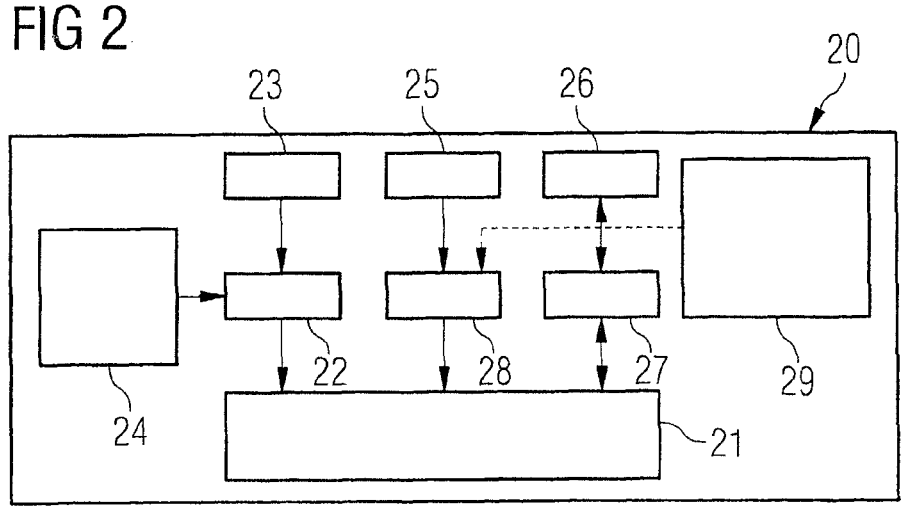
FIG. 2 is a schematic diagram of the components of a sensor module according to FIG. 1.

The structure of sensor module 20 is schematically shown in FIG. 2. Sensor module 20 thus comprises, in addition to sensor unit 25, a controller 21, a memory unit 22, a power generator 23, a power store 24 with voltage adaptation, an aerial 26, a transmitting/receiving unit 27, a data processing unit 28 and an assembly 29 with a bridge amplifier, a voltage amplifier and/or a filter.

Figure 3:
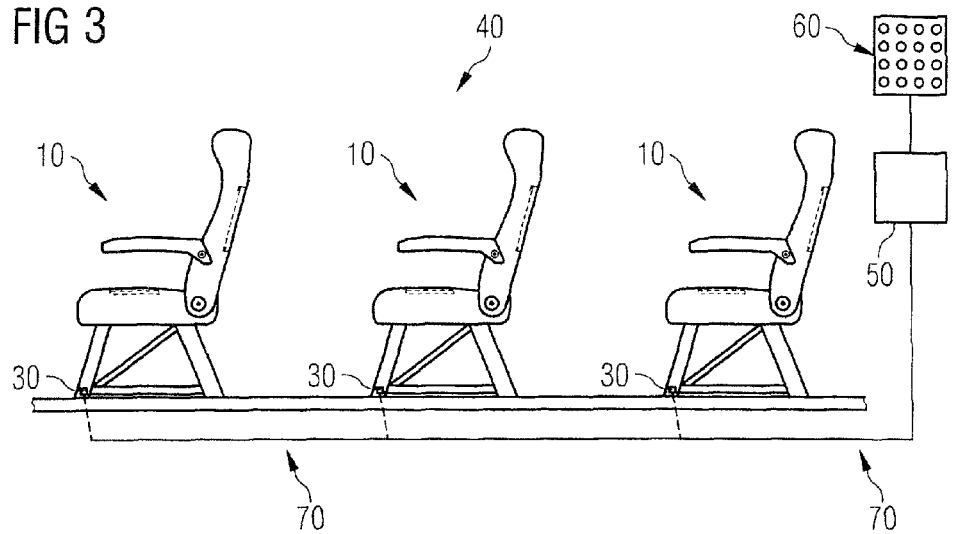
FIG. 3 shows a seat arrangement according to the present invention, with a plurality of seats according to FIG. 1 in a schematic cross-sectional view.
Figure 4:
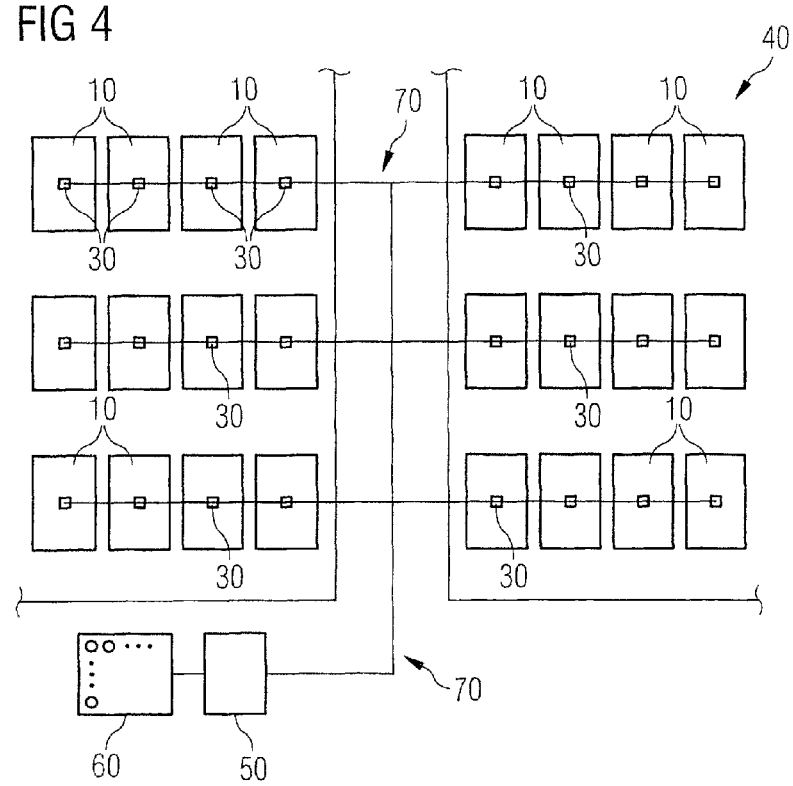
FIG. 4 is a schematic plan view of the seat arrangement of FIG. 3.

Seat arrangement 40 of an aircraft cabin shown in FIGS. 3 and 4 comprises a plurality of seats 10 of the type described above arranged in rows. A cabin aisle is provided in the approximate center of the aircraft cabin (cf. FIG. 4). The floor structure of the cabin floor comprises a bus structure 70 to enable data exchange between sensor modules 20 of seats 10 and a control unit 50. Control unit 50 and a display unit 60 are arranged, for example, at the end of the cabin aisle in the service area of the cabin crew.

As can be seen in FIGS. 1, 3 and 4, each seat 10 has a sensor node 30 associated with it that, among other things, enables a data exchange between sensor modules 20 and control unit 50 via bus structure 70. In other words, the data determined by sensor module 20 are forwarded to sensor node 30 and from there to control unit 50 via bus structure 70. Preferably, the plurality of sensor nodes 30 are arranged in the area of support structure 18, for example, integrated into a support leg. The data transfer from sensor modules 20 to sensor nodes 30 of a seat 10 and then from sensor node 30 to bus structure 70 is carried out in a wireless fashion. In this way, the wiring overhead is reduced, and a conventional aircraft cabin can be simply retrofitted by introducing the cables needed for bus structure 70. In a similar way, sensor modules 20 can be simply integrated into seats 10 or mounted on the respective seat elements.

As can be seen from FIG. 4 in the present exemplary embodiment, a seat 10 is associated with each sensor node 30. Alternatively, a different manner of assigning could also be chosen, for example, less or more seats 10 could be associated with one sensor node 30. Furthermore, a group of seats 10 and/or certain sensor modules 20 of the same type could be associated with one sensor node 30.

Next will be described a method for monitoring seat 10, or seat arrangement 40, with reference to the above explained seat 10, or seat arrangement 40. Reference values or reference value ranges for the individual seat elements are stored in a memory unit in control unit 50 in a retrievable fashion. For example, the reference value "seat occupied" can be stored for seat surface 13, the reference value "belt fastened" can be stored for seat belt 19, a predetermined angular value range can be stored for backrest 14 and armrest 15 and a setpoint position, such as "table up", can be stored as a reference value for folding table 17.

At a predetermined time, for example, shortly before aircraft takeoff, data detection by means of sensor module 20 can be started automatically or can be activated by the service personnel, so that all sensor modules 20 determine each state value of the associated seat element. For example, sensor module 20 associated with seat belt 90 determines a state value "belt fastened". All determined state values are transmitted on a wireless radio link to sensor node 30 associated with each seat 10 together with an identification code for unique association.

Subsequently, these data are forwarded from sensor node 30 to control unit 50 via bus structure 70. The state values and associated reference values are then compared in control unit 50 for each of the values determined by sensor modules 20. In case the state value does not match the reference value (or is not within the reference value range), an error value signal is issued by control unit 50 to display unit 60, which then indicates an alarm message in the form of a red light and/or an alarm tone. If, for example, sensor module 20 associated with seat belt 19 were to determine the state value "belt open", control unit 50, by comparing the state value "belt open" with the predetermined reference value "belt fastened", determines a mismatch and thus generates such an alarm signal.

Similarly, as explained with reference to seat belt 19, it can be checked, for example, whether the position of backrest 14 is within a predetermined reference value range, for example, 70° to 120°, in view of its angle with respect to the vertical. If this is not the case, that is the determined state value has a value of 130°, for example, a corresponding error signal and an alarm message are generated.

A further state value could also be the precise pressure exerted on seat surface 13 or backrest 14 determined by pressure sensors as sensor unit 25. Temperature values could also be measured as state values. If needed, the determined state values could be stored in a memory unit.

What is claimed is:

1. An aircraft seat comprising:
at least one seat element; and
at least one monitoring apparatus to monitor the seat element;
the monitoring apparatus having at least one sensor module to monitor at least one state value of the seat element,
the seat further comprising at least one power generator that is associated with the at least one sensor module to supply power or is integrated in the sensor module,
the sensor module being connected to a control unit that exchanges data and including at least one sensor unit which includes a strain gauge unit or a piezoelectric pressure measuring unit, and
the control unit being provided remote from the sensor module.

2. The aircraft seat according to claim 1, wherein the sensor module is connected to the control unit via a sensor node.

3. The aircraft seat according to claim 2, wherein a memory unit includes the sensor node and/or the control unit.

4. The aircraft seat according to claim 1, wherein a display unit displays an optical and/or acoustical indication of an error value.

5. The aircraft seat according to claim 1, wherein the sensor module includes a controller.

6. The aircraft seat according to claim 1, wherein the sensor module includes a data processing unit.

7. The aircraft seat according to claim 1, wherein the sensor module includes a transmitting and/or a receiving unit.

8. The aircraft seat according to claim 1, wherein the power generator is an electromechanical, electrothermal, piezoelectric, and/or photoelectric type power generator.

9. The aircraft seat according to claim 1, wherein the sensor module is associated with a power storage.

10. The aircraft seat according to claim 9, wherein the power storage includes an accumulator and/or a capacitor.

11. The aircraft seat according to claim 9, wherein the sensor module includes an assembly that converts voltage and charges the power storage.

12. The aircraft seat according to claim 1, wherein the seat element is a seat surface element, backrest element, an armrest, a footrest, an operating element, and/or a seat belt.

13. The aircraft seat according to claim 1, wherein the sensor unit detects the occupancy of the seat surface element, the pressure exerted on the seat element, the position of the seat element, and/or the temperature of the seat element or in the area of the seat element.

14. An aircraft seat comprising:
at least one seat element; and
at least one monitoring apparatus to monitor the seat element;
the monitoring apparatus having at least one sensor module to monitor at least one state value of the seat element, the sensor module including at least one sensor unit which includes a rotation angle sensor or a switching unit,
the seat further comprising at least one power generator that is associated with the at least one sensor module to supply power or is integrated in the sensor module,
the sensor module being connected to a control unit that exchanges data, and
the control unit being provided remote from the sensor module.

15. A method for monitoring at least one aircraft seat having at least one seat element and at least one monitoring apparatus,
the monitoring apparatus having at least one sensor module to monitor at least one state value of the seat element,
the sensor module further comprising at least one power generator that is associated with the at least one sensor module to supply power or is integrated in the sensor module,
the sensor module being connected to a control unit that exchanges data, and
the control unit being provided remote from the sensor module;
the method comprising:
providing at least one predetermined reference value or one reference value range for the seat element;
determining at least one state value of the seat element by a sensor module such that an angle of an armrest of the aircraft seat is determined as the state value;
transmitting the state value to a control unit;
comparing the state value with the reference value or reference value range; and
indicating an error value when the state value does not match the reference value or is not within the reference value range.

16. The method according to claim 15, wherein the state value is transmitted from the sensor module to a sensor node.

17. The method according to claim 16, wherein an identification value to identify each sensor module is transmitted to the sensor node and/or the control unit.

18. The method according to claim 15, wherein
the position of the seat element, the pressure exerted on the seat element, and/or the temperature in the area of the seat element is determined as the state value.

19. The method according to claim 15, wherein the pressure exerted on a seat surface or on a backrest of the seat is determined as the state value.

20. The method according to claim 15, wherein the at least one state value is stored in a memory unit.

21. The method according to claim 15, wherein the error value is optically and/or acoustically indicated.

22. The method according to claim 15, wherein data exchange is at least partially carried out in a wireless manner.

* * * * *